US011201983B2

(12) United States Patent
Morita et al.

(10) Patent No.: US 11,201,983 B2
(45) Date of Patent: Dec. 14, 2021

(54) IMAGE READING APPARATUS FOR DISPLAYING A SCREEN BASED ON A PLURALITY OF SCREEN DATA DIVIDED INTO A PLURALITY OF LAYERS

(71) Applicant: PFU LIMITED, Kahoku (JP)

(72) Inventors: Hyuma Morita, Kahoku (JP); Minami Nagasawa, Kahoku (JP)

(73) Assignee: PFU LIMITED, Kahoku (JP)

( * ) Notice: Subject to any disclaimer, the term of this patent is extended or adjusted under 35 U.S.C. 154(b) by 0 days.

(21) Appl. No.: 17/172,996

(22) Filed: Feb. 10, 2021

(65) Prior Publication Data

US 2021/0297555 A1 Sep. 23, 2021

(30) Foreign Application Priority Data

Mar. 18, 2020 (JP) .............................. JP2020-048251

(51) Int. Cl.
*H04N 1/00* (2006.01)
*H04N 1/327* (2006.01)
(52) U.S. Cl.
CPC ..... *H04N 1/32771* (2013.01); *H04N 1/00042* (2013.01); *H04N 1/00129* (2013.01); *H04N 1/00798* (2013.01); *H04N 2201/0081* (2013.01); *H04N 2201/0089* (2013.01)
(58) Field of Classification Search
CPC .................. H04N 1/00798; H04N 1/00042
See application file for complete search history.

(56) References Cited

U.S. PATENT DOCUMENTS

| 10,033,898 B2* | 7/2018 | Han ................... H04N 1/00938 |
| 2011/0116128 A1* | 5/2011 | Tamada ................ G06F 3/1204 |
| | | 358/1.15 |
| 2016/0274919 A1* | 9/2016 | Masuyama ........ H04N 1/00928 |
| 2018/0120925 A1* | 5/2018 | Takahashi ............. G06F 1/3287 |
| 2018/0136890 A1* | 5/2018 | Takahama ............... G06F 3/147 |

FOREIGN PATENT DOCUMENTS

JP          9-281939 A       10/1997

* cited by examiner

*Primary Examiner* — Benjamin O Dulaney
(74) *Attorney, Agent, or Firm* — Lewis Roca Rothgerber Christie LLP

(57) ABSTRACT

An image reading apparatus includes a first processor to control a communication device to receive a plurality of screen data divided into a plurality of layers from an information processing apparatus, and store the received plurality of screen data in a storage device, and a second processor to control a reading device to read an image from the medium and display a screen based on the plurality of screen data on the display device. The second processor transmits a request signal to the first processor when, while a screen based on screen data of a first predetermined layer among the plurality of screen data is displayed on the display device, displaying a screen based on screen data of a second predetermined layer is requested. The first processor reads the screen data of the second predetermined layer to transmit the screen data to the second processor based on the request signal.

9 Claims, 12 Drawing Sheets

FIG. 4

| DATA ID | INDEX INFORMATION | LAYER INFORMATION | ITEM INFORMATION | | | TRANSITION DESTINATION INFORMATION | SETTING INFORMATION |
|---|---|---|---|---|---|---|---|
| | | | ITEM ID | TYPE INFORMATION | CHARACTER INFORMATION | | |
| D0000 | A0000 | 1 | I0001 | TRANSITION | SCREEN 0001 | A0001 | — |
| | | | I0002 | JOB | JOB 0002 | — | GRAY SCALE, 600dpi, BOTH SIDES, … |
| | | | I0003 | TRANSITION | SCREEN 0003 | A0003 | — |
| | | | I0004 | JOB | JOB 0004 | — | GRAY SCALE, 300dpi, BOTH SIDES, … |
| D0001 | A0001 | 2 | I0011 | JOB | JOB 0011 | — | GRAY SCALE, 600dpi, ONE SIDE, … |
| | | | I0012 | TRANSITION | SCREEN 0012 | A0021 | — |
| | | | I0013 | JOB | JOB 0013 | — | GRAY SCALE, 300dpi, ONE SIDE, … |
| | | | I0014 | TRANSITION | SCREEN 0014 | A0041 | — |
| D0003 | A0003 | 2 | I0031 | JOB | JOB 0031 | — | BLACK AND WHITE, 600dpi, ONE SIDE, … |
| | | | I0032 | JOB | JOB 0032 | — | BLACK AND WHITE, 300dpi, ONE SIDE, … |
| D0012 | A0021 | 3 | I0121 | JOB | JOB 0121 | — | COLOR, 1200dpi, ONE SIDE, … |
| | | | I0122 | TRANSITION | SCREEN 0122 | A0221 | — |
| | | | I0123 | JOB | JOB 0123 | — | COLOR, 1200dpi, BOTH SIDES, … |
| D0014 | A0041 | 3 | I0141 | JOB | JOB 0141 | — | COLOR, 900dpi, ONE SIDE, … |
| | | | I0142 | JOB | JOB 0142 | — | COLOR, 900dpi, BOTH SIDES, … |
| … | | … | … | … | … | … | … |

IMAGE READING APPARATUS FOR DISPLAYING A SCREEN BASED ON A PLURALITY OF SCREEN DATA DIVIDED INTO A PLURALITY OF LAYERS

CROSS-REFERENCE TO RELATED APPLICATIONS

This application is based upon and claims the benefit of priority of prior Japanese Patent Application No. 2020-48251, filed on Mar. 18, 2020, the entire contents of which are incorporated herein by reference.

TECHNICAL FIELD

Embodiments discussed in the present specification relate to displaying a screen.

BACKGROUND

An image reading apparatus, such as a scanner, that reads an image from a medium displays a screen based on a plurality of screen data on a display device to accommodate various applications. The image reading apparatus is required to appropriately display a screen based on newly requested screen data from among the plurality of screen data while reading the image from the medium.

A display apparatus including a first memory to expand image data of two screens and a second memory to expand image data of one screen is disclosed (Japanese Unexamined Patent Application Publication (Kokai) No 110-281939). The display apparatus expands first image data of one screen for a currently displayed screen and second image data of one screen for a next display candidate screen into the first memory, and transfers the first image data to the second memory to display it on the screen. The display apparatus transfers the second image data to the second memory when the next display candidate screen is selected, to update the display of the screen.

SUMMARY

According to some embodiments, an image reading apparatus includes a communication device capable of communicating with an information processing apparatus, a storage device, a display device, a reading device to read an image from a medium, a first processor to control the communication device to receive a plurality of screen data divided into a plurality of layers from the information processing apparatus, and store the received plurality of screen data in the storage device, and a second processor to control the reading device to read an image from the medium and display a screen based on the plurality of screen data on the display device. The second processor transmits a request signal to the first processor when, while a screen based on screen data of a first predetermined layer among the plurality of screen data is displayed on the display device, displaying a screen based on screen data of a second predetermined layer is requested. The first processor reads the screen data of the second predetermined layer from the storage device to transmit the read screen data to the second processor based on the request signal.

According to some embodiments, a method for controlling an image reading apparatus includes control ling a communication device capable of communicating with an information processing apparatus to receive a plurality of screen data divided into a plurality of layers from the information processing apparatus, and storing the received plurality of screen data in a storage device, by a first processor, controlling a reading device to read an image from a medium and displaying a screen based on the plurality of screen data on a display device, by a second processor, transmitting a request signal to the first processor, by the second processor, when, while a screen based on screen data of a first predetermined layer among the plurality of screen data is displayed on the display device, displaying a screen based on screen data of a second predetermined layer is requested, and reading the screen data of the second predetermined layer from the storage device to transmit the read screen data to the second processor based on the request signal, by the first processor.

According to some embodiments, a computer-readable, non-transitory medium stores a computer program. The computer program causes a second processor of an image reading apparatus including a communication device capable of communicating with an information processing apparatus, a storage device, a display device, a reading device to read an image from a medium, and a first processor to control the communication device to receive a plurality of screen data divided Into a plurality of layers from the information processing apparatus, and store the received plurality of screen data in the storage device, to execute a process. The process includes controlling the reading device to read an image from the medium and displaying a screen based on the plurality of screen data on the display device, when, while a screen based on screen data of a first predetermined layer among the plurality of screen data is displayed on the display device, displaying a screen based on screen data of a second predetermined layer is requested, transmitting a request signal to the first processor to cause the first processor to read the screen data of the second predetermined layer from the storage device to transmit the read screen data to the second processor.

BRIEF DESCRIPTION OF DRAWINGS

FIG. 4 is a diagram illustrating an example of a data structure of a screen data table.

DESCRIPTION OF EMBODIMENTS

It is to be understood that both the foregoing general description and the following detailed description are exemplary and explanatory, and are not restrictive of the invention, as claimed.

Hereinafter, an image reading apparatus, a method and a computer-readable, non-transitory medium storing a computer program according to an embodiment, will be described with reference to the drawings. However, it should be noted that the technical scope of the invention is not limited to these embodiments, and extends to the inventions described in the claims and (heir equivalents.

Figure 1:
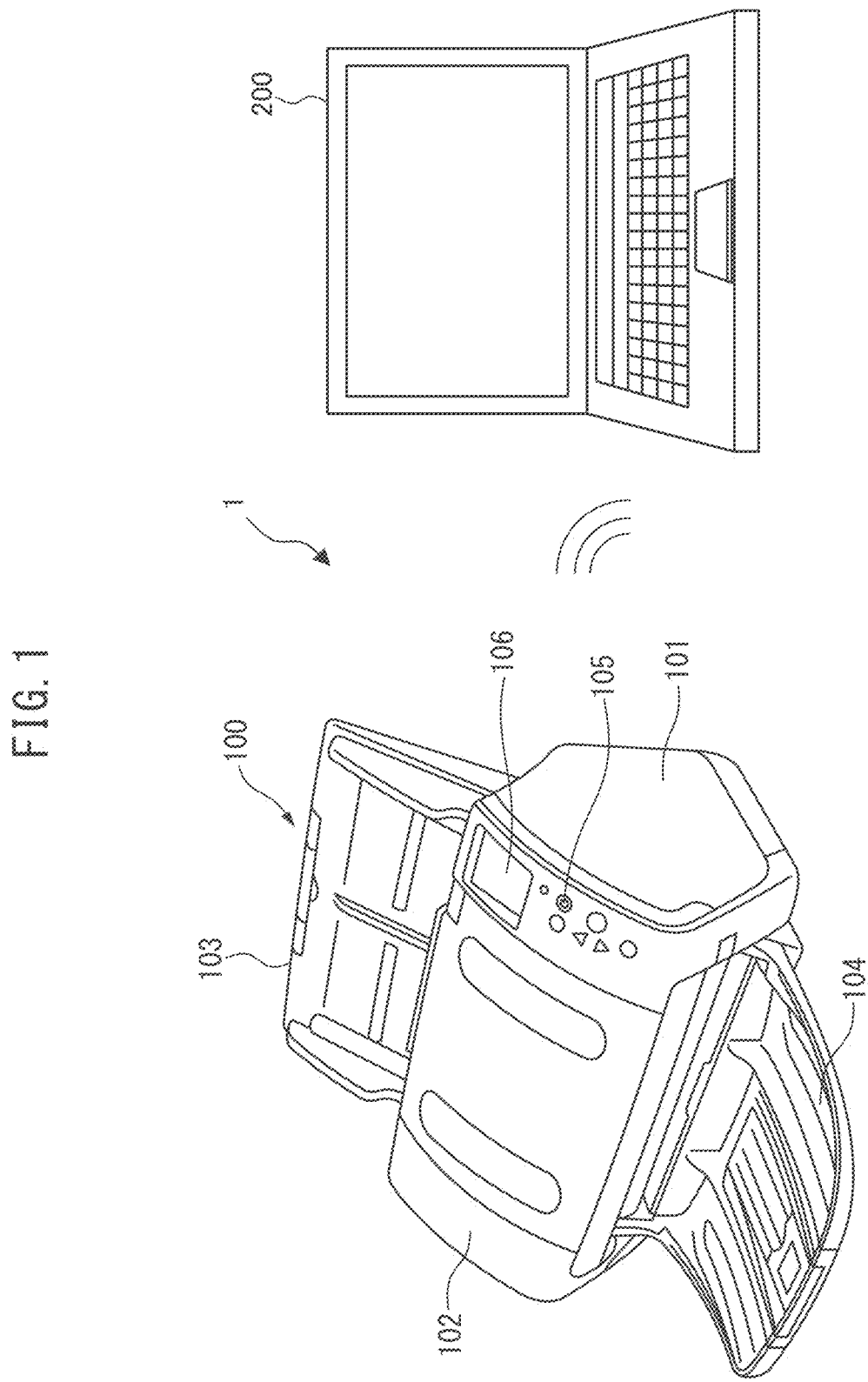
FIG. 1 is a configuration diagram of an example of an image processing system 1 according to the embodiment.

FIG. 1 is a configuration diagram of an example of an image processing system 1 according to the embodiment.

The image processing system 1 includes an image reading apparatus 100 and an information processing apparatus 200. The image reading apparatus 100 is, for example, an image scanner, etc. The image reading apparatus 100 conveys and images a medium that is a document. A medium is paper, thick paper, a card, a brochure, a passport, etc. The image reading apparatus 100 may be a facsimile, a copying machine, a printer multifunction machine (MFP, Multifunction Peripheral), etc. The information processing apparatus 200 is a server, etc. The information processing apparatus 200 stores a plurality of screen data for generating screens displayed on the image reading apparatus 100. The image reading apparatus 100 and the information processing apparatus 200 are communicatively connected to each other A plurality of image reading apparatuses 100 may be communicatively connected to the information processing apparatus 200.

The image reading apparatus 100 includes a lower housing 101, an upper housing 102, a medium tray 103, an ejection tray 104, an operation device 105, and a display device 106, etc.

The upper housing 102 is located at a position covering the upper surface of the medium conveying device 100 and is engaged with the lower housing 101 by hinges so as to be opened and closed at a time of medium jam, during cleaning the inside of the medium conveying device 100, etc.

The medium tray 103 is engaged with the lower housing 101 in such a way as to be able to place a medium to be conveyed. The ejection tray 104 is engaged with the lower housing 101 in such a way as to be able to hold an ejected medium.

The operation device 105 includes an input device such as a button, and an interface circuit acquiring a signal from the input device, receives an input operation by a user, and outputs an operation signal based on the input operation by the user.

The display device 106 is an example of a display device, and includes a display including a liquid crystal or organic electro-luminescence (EL), and an interface circuit for outputting image data to the display, and displays the image data on the display.

Figure 2:
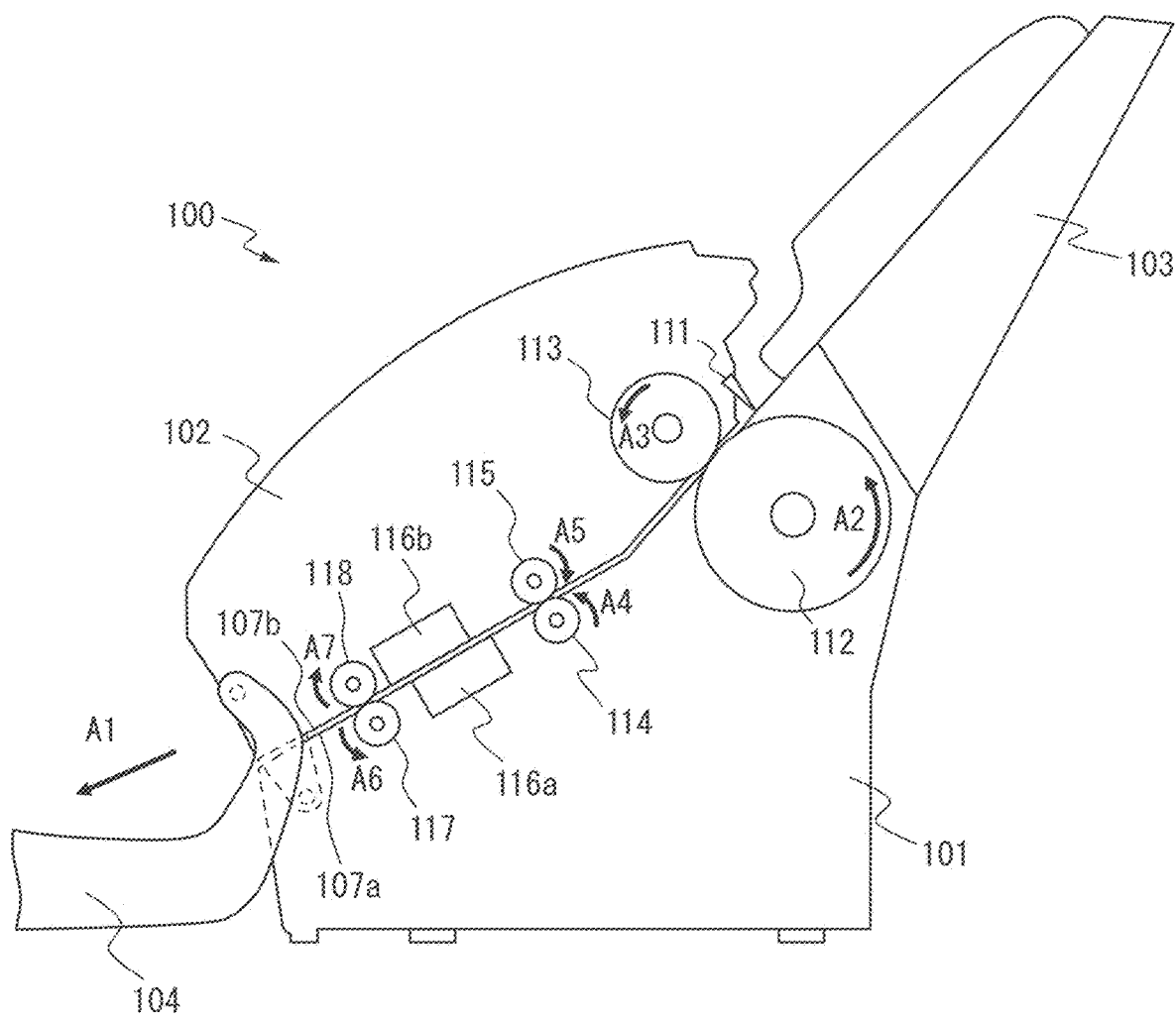
FIG. 2 is a diagram for illustrating a conveyance path inside an image reading apparatus 100.

FIG. 2 is a diagram for illustrating a conveyance path inside the image reading apparatus 100.

The conveyance path inside the image reading apparatus 100 includes a sensor 111, a feed roller 112, a brake roller 113, a first conveyance roller 114, a second conveyance roller 115, a first imaging device 116a, a second imaging device 116b, a third conveyance roller 117 and a fourth conveyance roller 118, etc. The number of each roller is not limited to one, and may be plural.

A top surface of die lower housing 101 forms a lower guide 107a of a conveyance path of a medium, and a bottom surface of die upper housing 102 forms an upper guide 107b of the conveyance path of a medium. An arrow A1 in FIG. 2 indicates a medium conveying direction Hereinafter, an upstream refers to an upstream in the medium conveying direction A1, and a downstream refers to a downstream in the medium conveying direction A1.

The sensor 111 is located upstream of the feed roller 112 and the brake roller 113. The sensor 111 includes a contact detection sensor, and detects whether or not the medium is placed on the medium tray 103. The sensor 111 generates and outputs a medium signal whose signal value changes in a state where the medium is placed on the medium tray 103 and a state where the medium is not placed.

The first imaging device 116a includes a line sensor based on a unity-magnification optical system type contact image sensor (CIS) including an imaging element based on a complementary metal oxide semiconductor (CMOS) linearly located in a main scanning direction. Further, the first imaging device 116a includes a lens for forming an image on the imaging element, and an A/D converter for amplifying and analog-digital (A/D) converting an electric signal output front the imaging element. The first imaging device 116a is an example of a reading device, and reads an image from a front surface of the conveyed medium to generate and output an input image.

Similarly, the second imaging device 116b includes a line sensor based on a unity-magnification optical system type CIS including an imaging element based on a CMOS linearly located in a main scanning direction. Further, the second imaging device 116b includes a lens for forming an image on the imaging element, and an A/D converter for amplifying and A/D converting an electric signal output from the imaging element. The second imaging device 116b is an example of a reading dev ice, and reads an image from a back surface of the conveyed medium to generate and output an input image.

Only either of the first imaging device 116a and the second imaging device 116b may be located in the image reading apparatus 100 and only one side of a medium may be read. Further, a line sensor based on a unity-magnification optical system type CIS including an imaging element based on charge coupled devices (CCDs) may be used in place of the line sensor based on a unity-magnification optical system type CIS including an imaging element based on a CMOS. Further, a line sensor based on a reduction optical system type line sensor including an imaging element based on CMOS or CCDs. Hereinafter, the first imaging device 116a and the second imaging device 116b may be collectively referred to as imaging device 116.

A medium placed on the medium tray 103 is conveyed between the lower guide 107a and the upper guide 107b in the medium conveying direction A1 by the feed rollers 112 rotating in a direction of an arrow A2 in FIG. 2, that is, a medium feeding direction. When a medium is conveyed, the brake rollers 113 rotate in a direction of an arrow A3, that is, a direction opposite to the medium feeding direction. By the workings of the feed rollers 112 and the brake rollers 113, when a plurality of media are placed on the medium tray 103, only a medium in contact with the feed rollers 112, out of the media placed on the medium tray 103, is separated Consequently, the medium conveying apparatus 100 operates in such a way that conveyance of a medium other than the separated medium is restricted (prevention of multi-feed).

The medium is fed between the first conveyance rollers 114 and the second conveyance rollers 115 while being guided by the lower guide 107a and the upper guide 107b. The medium is fed between the first imaging device 116a and the second imaging device 116b by the first conveyance roller 114 and the second conveyance roller 115 rotating in directions of an arrow A4 and an arrow A5, respectively. The medium read by the imaging devices 116 is ejected on the ejection tray 104 by the third conveyance roller 117 and the fourth conveyance roller 118 rotating in directions of an arrow A6 and an arrow A7, respectively. The feeding roller 112, the brake roller 113, the first conveyance roller 114, the second conveyance roller 115, the third conveyance roller 117 and the fourth conveyance roller 118 are examples of a conveying module.

Figure 3:
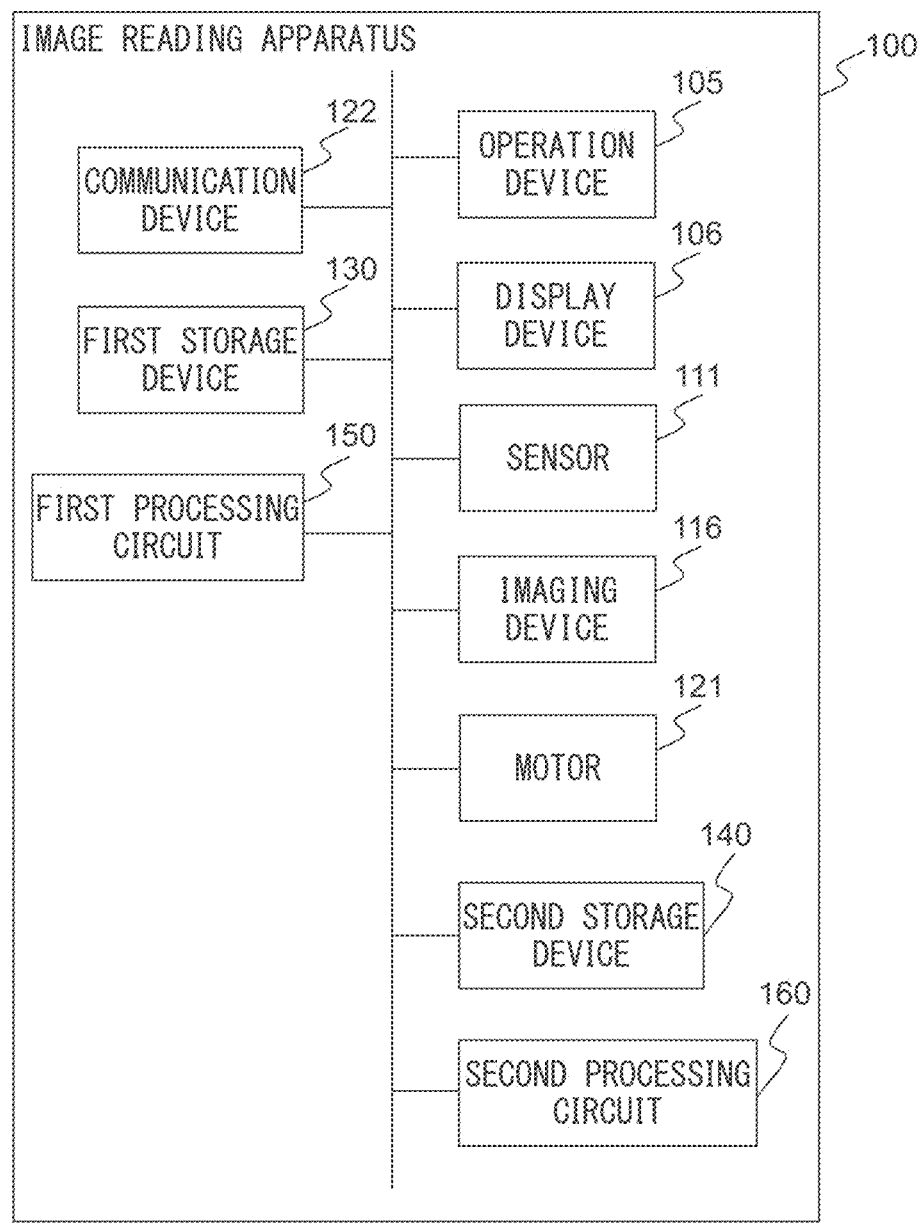
FIG. 3 is a block diagram illustrating a schematic configuration of the image reading apparatus 100.

FIG. 3 is a block diagram illustrating a schematic configuration of the image reading apparatus 100.

The image reading apparatus 100 further includes a motor 121, a communication device 122, a first storage device 130, a second storage device MO, a first processing circuit 150 and a second processing circuit 160, etc., in addition to the configuration described above.

The motor 121 includes one or more motors. The motor 121 conveys the medium by rotating the feed roller 112, the brake roller 113, the first conveyance roller 114, the second conveyance roller 115; the third conveyance roller 117, and the fourth conveyance roller 118 by a control signal from the second processing circuit 160.

The communication device 122 includes an antenna for transmitting and receiving a wireless signal and a wireless communication interface circuit for transmitting and receiving signals through a wireless communication line according to a predetermined communication protocol. For example, the predetermined communication protocol is a wireless local area network (LAN). The communication device 122 is capable of communicating with the information processing apparatus 200, and transmits and receives various images and information in communication connection with the information processing apparatus 200. Further, as the communication device 122, for example, a communication device including an interface circuit conforming to a serial bus such as universal serial bus (USB) may be used.

The first storage device 130 is an example of a storage device, and includes a memory device such as a random access memory (RAM) or a read only memory (ROM), a fixed disk device such as a hard disk, or a portable storage device such as a flexible disk or an optical disk. The first storage device 130 stores computer programs, databases, tables, etc., used for various kinds of processing of the image processing apparatus 100. The computer program may be installed on the storage dev ice 130 from a computer-readable, non-transitory medium such as a compact disc read only memory (CD-ROM), a digital versatile disc read only memory (DVD-ROM), or the like by using a well-known setup program etc. The first storage device 130 stores a screen data table as data Details of the screen data table will be described later.

The second storage device MO is an example of a second storage device, and includes a memory device such as a RAM or a ROM, a fixed disk device such as a hard disk, or a portable storage device such as a flexible disk or an optical disk. The second storage device 140 stores computer programs, databases, tables, etc., used for various kinds of processing of the image processing apparatus 100. The computer program may be installed on the second storage device 140 from a computer-readable, non-transitory medium such as a CD-ROM, a DVD-ROM, or the like by using a well-known setup program etc.

The first storage device 130 and the second storage device 140 may be configured by a common storage device. In this case, in the common storage device, a storage area corresponding to a storage area of the first storage dev ice 130 and a storage area corresponding to a storage area of the second storage device 140 are divided and managed.

The first processing circuit 150 is an example of a first processor, and operates according to a program stored in advance in the first storage device 130. The first processing circuit 150 is, for example, a CPU (Central Processing Unit) The first processing circuit 150 may be a digital signal processor (DSP), a large scale integration (LSI), an application specific integrated circuit (ASIC), a field-programmable gate array (FPGA), etc.

The first processing circuit 150 is connected to the communication device 122, the first storage device 130, the second storage device 140 and the second processing circuit 160, etc., and controls each of these units. The first processing circuit 150 may be further connected to the operation device 105, the display device 106, the sensor 111, the imaging device 116 and the motor 121, and control each of these units. The first processing circuit 150 performs communication control, etc., of the communication device 122, and stores various data received from the information processing apparatus 200 via the communication device 122 in the first storage device 130.

The second processing circuit 160 is an example of a second processor, operates according to a program stored in advance in the second storage device 140. The second processing circuit 160 is, for example, a CPU The second processing circuit 160 may be a DSP, an LSI, an ASIC, a FPGA, etc. For example, as the second processing circuit 160, a processor having a lower processing capacity than the first processing circuit 150, is used. As the second processing circuit 160, a processor having a same processing capacity as the first processing circuit 150 or a higher processing capacity than the first processing circuit 150, may be used.

The second processing circuit 160 is connected to the operation device 105, the display device 106, the sensor 111, the imaging device 116, the motor 121, the first storage device 130, the second storage device 140 and the first processing circuit 150, etc., and controls each of these units. The second processing circuit 160 may be further connected to the communication device 122, and control the communication device 122. The second processing circuit 160 controls the operation device 105, performs display control of the display device 106, and receives a request from the user. Further, the second processing circuit 160 performs the drive control of the motor 121 and imaging control of the imaging device 116, etc., to generate the input image, in accordance with an output signal from the sensor 111. Further, the second processing circuit 160 performs monitoring of the occurrence of abnormality such as jam, multi-feeding, slip, skew, etc., of the conveyed medium, correction of the generated input image, temperature monitoring of the image reading apparatus 100, etc.

FIG. 4 is a diagram illustrating an example of a data structure of the screen data table.

The screen data table stores a plurality of screen data received from the information processing apparatus 200. Each screen data is data for generating a screen to be displayed on the display device 106, and is divided into a plurality of layers. The layer of screen data corresponds to the layer of each screen displayed on the display device 106. The screen data of the first layer is data for generating an initial screen initially displayed on the display device 106, and a single screen data is stored in the screen data table as the screen data of the first layer. The screen data of the second layer or larger number layer is data for generating a screen to which a screen generated from the screen data of the higher layer transitions, and one or more screen data is stored in the screen data table as screen data of the second layer or larger number layer.

One or more items is displayed selectably by the user on the screen generated from each screen data Each item is a job or screen transition, etc. The job is a setting relating to an image reading processing of the image reading apparatus 100, and is set for each type of the medium (general paper, business card, photograph, etc.) to be read by the image reading apparatus 100, for example. The job includes settings such as color setting of the generated input image (color/gray scale/black and while, etc.), resolution (200 dpi/300 dpi/600 dpi, etc.), and reading surface (both sides/one side). The screen transition is a transition (movement) from a screen currently displayed on the display device 106 to a screen based on the screen data of another layer. Each item may include item other than the job or the screen transition, such as specifying user's identification information or specifying schedule information of the image reading processing.

Each screen data includes identification information (data ID), index information, layer information, one or more item information, etc., of the screen data. The index information is information indicating an index of each screen data, and is set so that each predetermined bit in the index information indicates a layer to which each screen data belongs and a position in each layer in accordance with a predetermined rule. The layer information indicates the layer to which each screen data belongs. Each item information indicates information relating to each item displayed by the screen data, and includes identification information (item ID), type information, character information, transition destination information, setting information, etc., each item information. The type information indicates whether each item is the screen transition or the job. The character information indicates characters displayed according to the screen data. The transition destination information indicates the index information of the screen data for generating the transition destination screen when each item is the screen transition. The setting information indicates each setting (color setting, resolution, reading surface, etc.) corresponding to the job when each item is the job.

Figure 5:
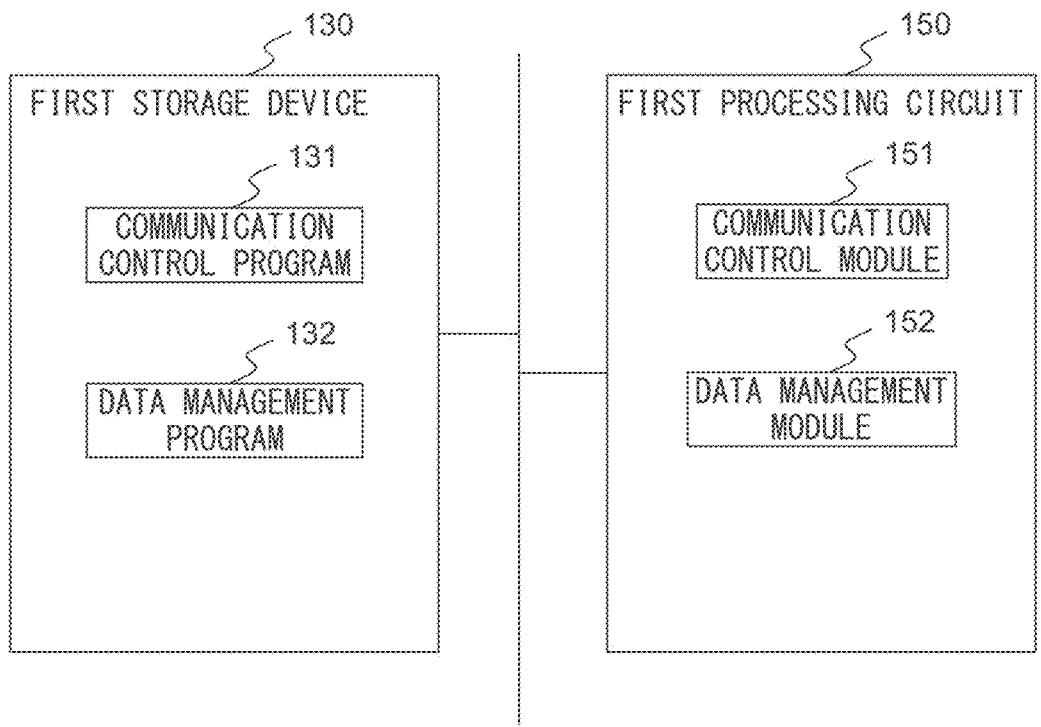
FIG. 5 is a diagram illustrating a schematic configuration of a first storage device 130 and a first processing circuit 150.

FIG. 5 is a diagram illustrating a schematic configuration of the first storage device 130 and the first processing circuit 150.

As shown in FIG. 5, the first storage device 130 stores a communication control program 131 and a data management program 132. Each of these programs is a functional module implemented by software operating on a processor. The first processing circuit 150 reads each program stored in the first storage device 130, and operates according to each of the read programs. Thus, the first processing circuit 150 functions as a communication control module 151 and a data management module 152.

Figure 6:
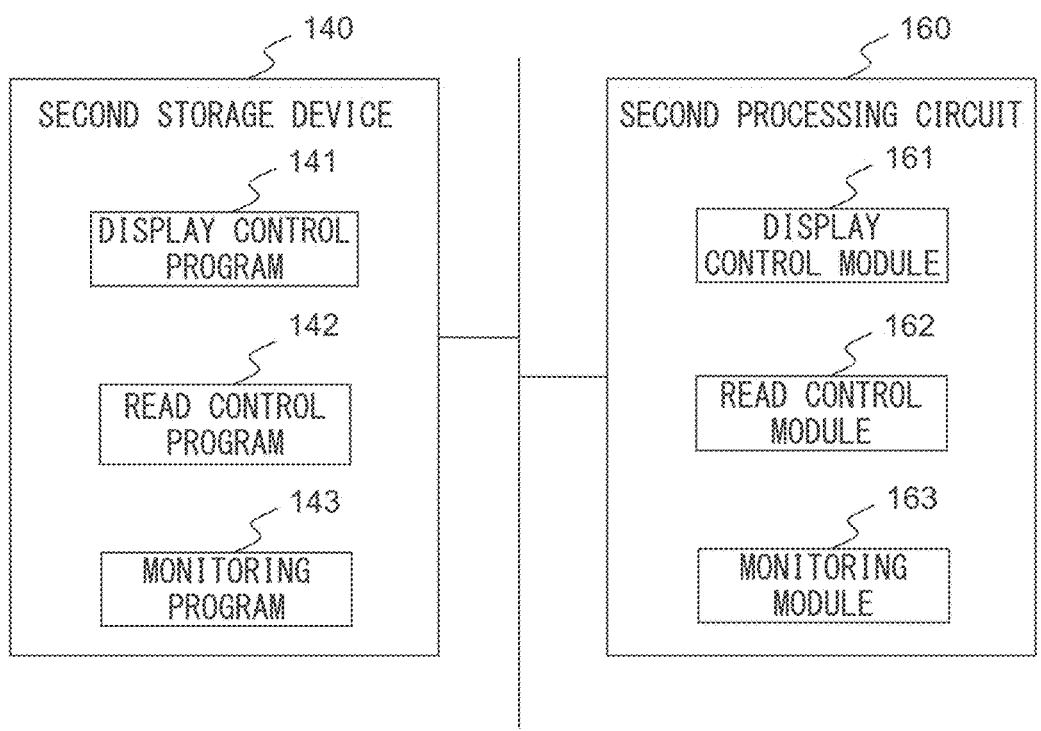
FIG. 6 is a diagram illustrating a schematic configuration of a second storage device 140 and a second processing circuit 160.

FIG. 6 is a diagram illustrating a schematic configuration of the second storage device 140 and the second processing circuit 160.

As shown in FIG. 6, the second storage device 140 stores a display control program 141, a read control program 142 and a monitoring program 143, etc. Each of these programs is a functional module implemented by software operating on a processor. The second processing circuit 160 reads each program stored in the second storage device 140, and operates according to each of the read programs. Thus, the second processing circuit 160 functions as a display control module 161, the read control module 162 and a monitoring module 163.

Figure 7:
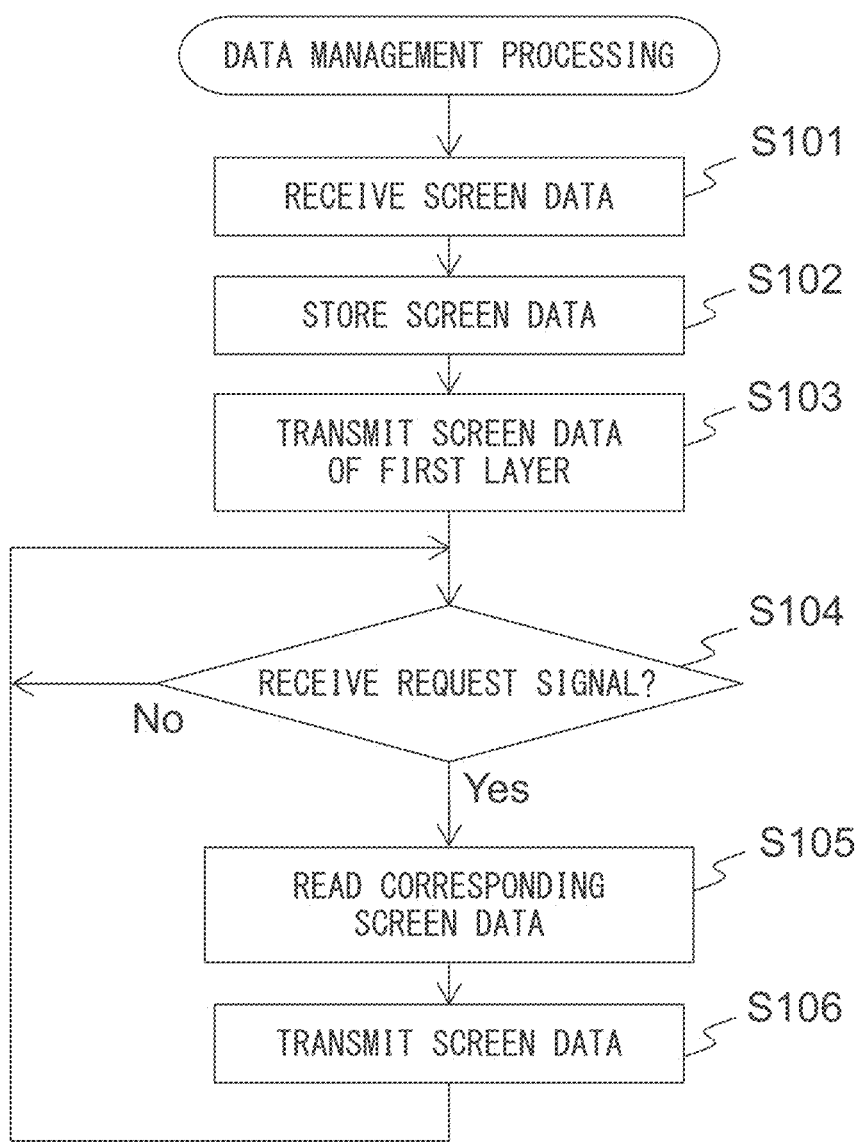
FIG. 7 is a flowchart illustrating an operation example of a data management processing.

FIG. 7 is a flowchart illustrating an operation example of a data management processing of the image reading apparatus 100.

Hereinafter, an example of the operation of the data management processing of the image reading apparatus 100 will be described with referring to the flowchart illustrated in FIG. 7. Note that a flow of the operation described below is performed in cooperation with each element of the image reading apparatus 100 mainly by the first processing circuit 150, based on the program being previously stored in the first storage device 130. The flow of the operation shown in FIG. 7 is executed when the image reading apparatus 100 is started.

First, the communication control module 151 controls the communication device 122, to receive a plurality of screen data from the information processing apparatus 200 (step S101). For example, the communication control module 151 transmits a screen data request signal for requesting acquisition of the plurality of screen data to the information processing apparatus 200 via the communication dev ice 122, and receives the screen data from the information processing apparatus 200 via the communication device 122. The information processing apparatus 200 may spontaneously transmit the screen data to the image reading apparatus 100.

The communication control module 151 preferably receives collectively the plurality of screen data from the information processing apparatus 200. Thus, the image reading apparatus 100 can reduce the processing load applied to the transmission processing in the information processing apparatus 200 and reduce the overhead applied to the communication processing between the image reading apparatus 100 and the information processing apparatus 200 in the network. However, the communication control module 151 may periodically receive the screen data from the information processing apparatus 200 and store the received screen data in the screen data table to update the screen data table.

Next, the communication control module 151 stores the received plurality of screen data in the screen data table (step S102).

Next, the data management module 152 transmits the screen data of the first layer to the display control module 161 of the second processing circuit 160 (step S103). The data management module 152 transmits the screen data of the first layer to the display control module 161 by die well-known inter-processor communication. For example, the data management module 152 writes the screen data of the first layer into the second storage device 140 and transmits a signal indicating that fact to the second processing circuit 160 (the display control module 161) to transmit the screen data of the first layer to the display control module 161.

Next, the data management module 152 determines whether or not it has received a request signal from the display control module 161 (step S104). The request signal is a signal for the display control module 161 to request an acquisition of the screen data from the data management module 152. That is, the request signal from the second processing circuit 160 causes the first processing circuit 150 to read the screen data of the requested layer from the first storage device 130 and send it to the second processing circuit 160. The request signal includes the index information (transition destination information) of the requested screen data. The display control module 161 transmits the request signal to the data management module 152 by the well-known inter-processor communication. For example, the display control module 161 writes the index information (transition destination information) of the requested screen data to the first storage device 130 and transmits a signal indicating that fact to the first processing circuit 150 (the data management module 152) to transmit the request signal to the data management module 152. The data management module 152 waits until it receives the request signal from the display control module 161.

Next, the data management module 152 identifies the screen data corresponding to the index information (transition destination information) included in the request signal by referring to the screen data table and reads it from the screen data table when it receives the request signal from the display control module 161 (step S105).

Next, the data management module 152 transmits tire read screen data to the display control module 161 in the same manner as the process in step S103 (step S106), and returns the process to step S104. Thereafter, the data management module 152 repeats the processes of steps S104 to S106. Thus, the data management module 152 reads the screen data of the other layer requested by the display control module 161 from the screen data table to transmit the screen data to the display control module 161 based on the request signal.

Figure 8:
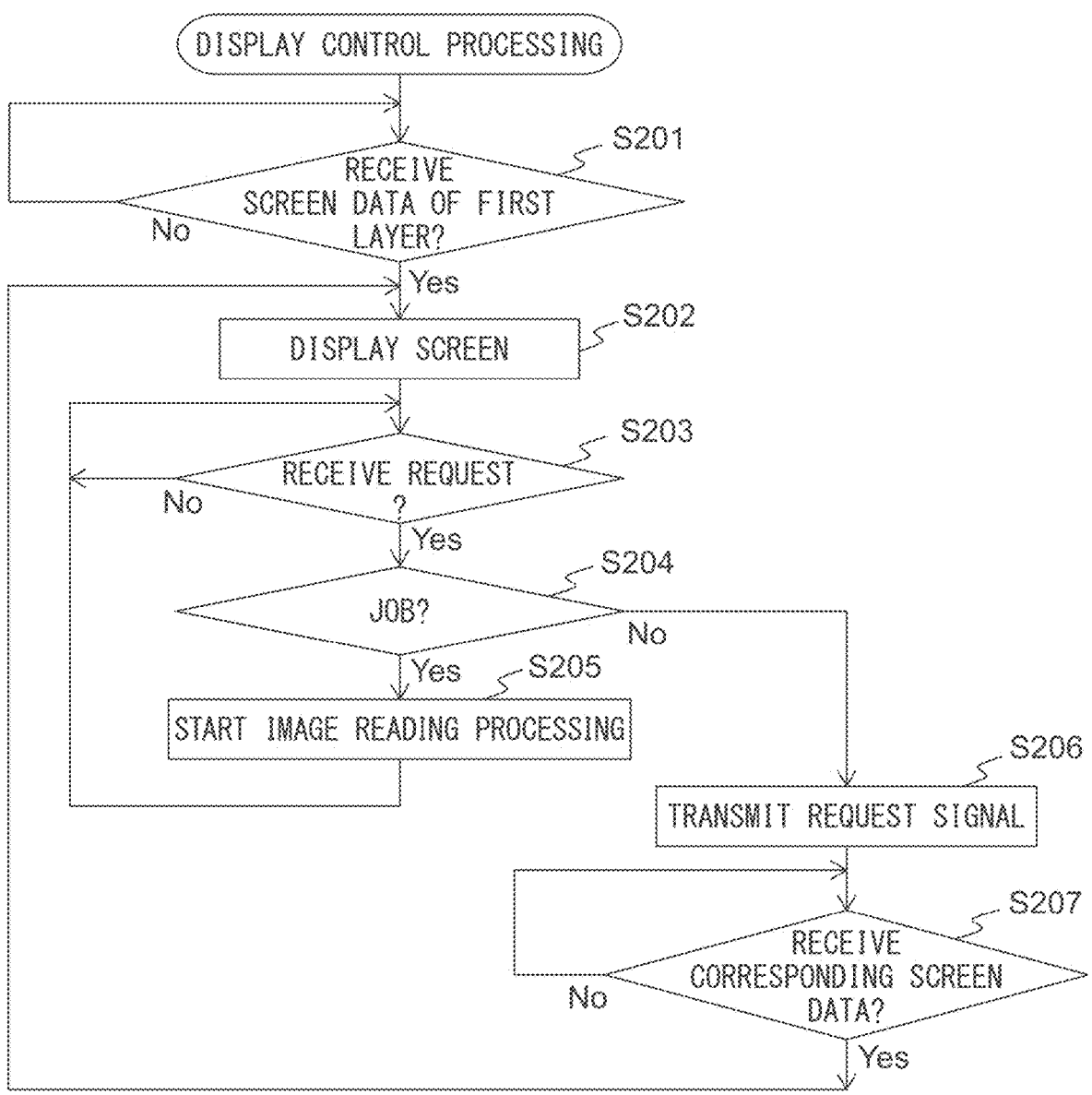
FIG. 8 is a flowchart illustrating an operation example of a display control processing.

FIG. 8 is a flowchart illustrating an operation example of a display control processing of the image reading apparatus 100.

Hereinafter, an example of the operation of the display control processing of the image reading apparatus 100 will be described with referring to the flowchart illustrated in FIG. 8. Note that a flow of the operation described below is performed in cooperation with each element of the image reading apparatus 100 mainly by the second processing circuit 160, based on the program being previously stored in the second storage device 140. The flow of the operation shown in FIG. 8 is executed when the image reading apparatus 100 is started.

First, the display control module 161 determines whether or not it has received the screen data of the first layer from the data management module 152 (step S201). The screen data of the first layer is transmitted from the data management module 152 to the display control module 161 in step S103 of FIG. 7. The display control module 161 waits until it receives the screen data of the first layer from the data management module 152.

Next, the display control module 161 generates a screen based on the received screen data and displays the screen on the display device 106 when it receives the screen data from the data management module 152 (step S202) The display control module 161 extracts, for each item information included in the received screen data, the character information included in each item information, and generates a screen, as the screen based on the screen data, in which the extracted character information is arranged so as to be specifiable by the user.

Next, the display control module 161 determines whether or not it has received a request corresponding to any item among the items included in the screen displayed on the display device 106 from the user using the operating device 105 (step S203) When any item displayed on the display device 106 is specified by the user using the operation device 105, the display control module 161 receives the request corresponding to the specified item.

Next, the display control module 161 determines whether the specified item is the screen transition or the job (step S204). The display control module 161 determines whether the specified item is the screen transition or the job based on the type information corresponding to the specified item.

When the specified item is the job, the read control module 162 starts the image reading processing according to the specified job (step S205), and returns the process to step S203. The read control module 162 specifies the setting corresponding to the specified iob based on the setting information corresponding to the specified item. The read control module 162 controls the imaging device 116 to read the image from the medium in the image reading processing. Details of the image reading processing will be described later. Thereafter, the display control module 161 executes the display control processing in parallel with the image reading processing until the image reading processing is completed.

On the other hand, when the specified item is the screen transition, the display control module 161 transmits the request signal including the transition destination information corresponding to the specified item to the data management module 152 (step S206).

Next, the display control module 161 determines whether or not it has received the screen data requested by the request signal from the data management module 152 (step S207). The display control module 161 waits until it receives the screen data from the data management module 152. On the other hand, the display control module 161 proceeds the process to step S202, generates the screen based on the received screen data, and displays it on the display device 106 when it receives the screen data from the data management module 152. Thereafter, the display control module 161 repeats the processes of steps S203 to S207.

Thus, in step S202, the display control module 161 displays the screen based on the plurality of screen data on the display device 106. In step S206, the display control module 161 transmits the request signal to the data management module 152 when, while the screen based on the screen data of a first predetermined layer among the plurality of screen data is displayed on the display device 106, displaying the screen based on the screen data of a second predetermined layer other than the first predetermined layer is requested. Also, the display control module 161 transmits the request signal to the data management module 152 when displaying the screen based on the screen data of the second predetermined layer is requested in a state in which the image reading processing is executed.

Each screen data stored in the screen data table may include a screen (image) itself displayed on the display device 106. In this case, each screen data may not include the character information. In this case, in step S202, the display control module 161 displays the screen included in the screen data received from the data management module 152 on the display device 106. Further, in step S106 of FIG. 7, the data management module 152 may generate the screen based on the screen data and transmit the screen to the display control module 161. In this case, in step S202, die display control module 161 displays the screen received from the data management module 152 on the display device 106. Thus, the image reading apparatus 100 can further reduce the processing load by the second processing circuit 160, thereby can suitably perform the image reading processing.

Figure 9:
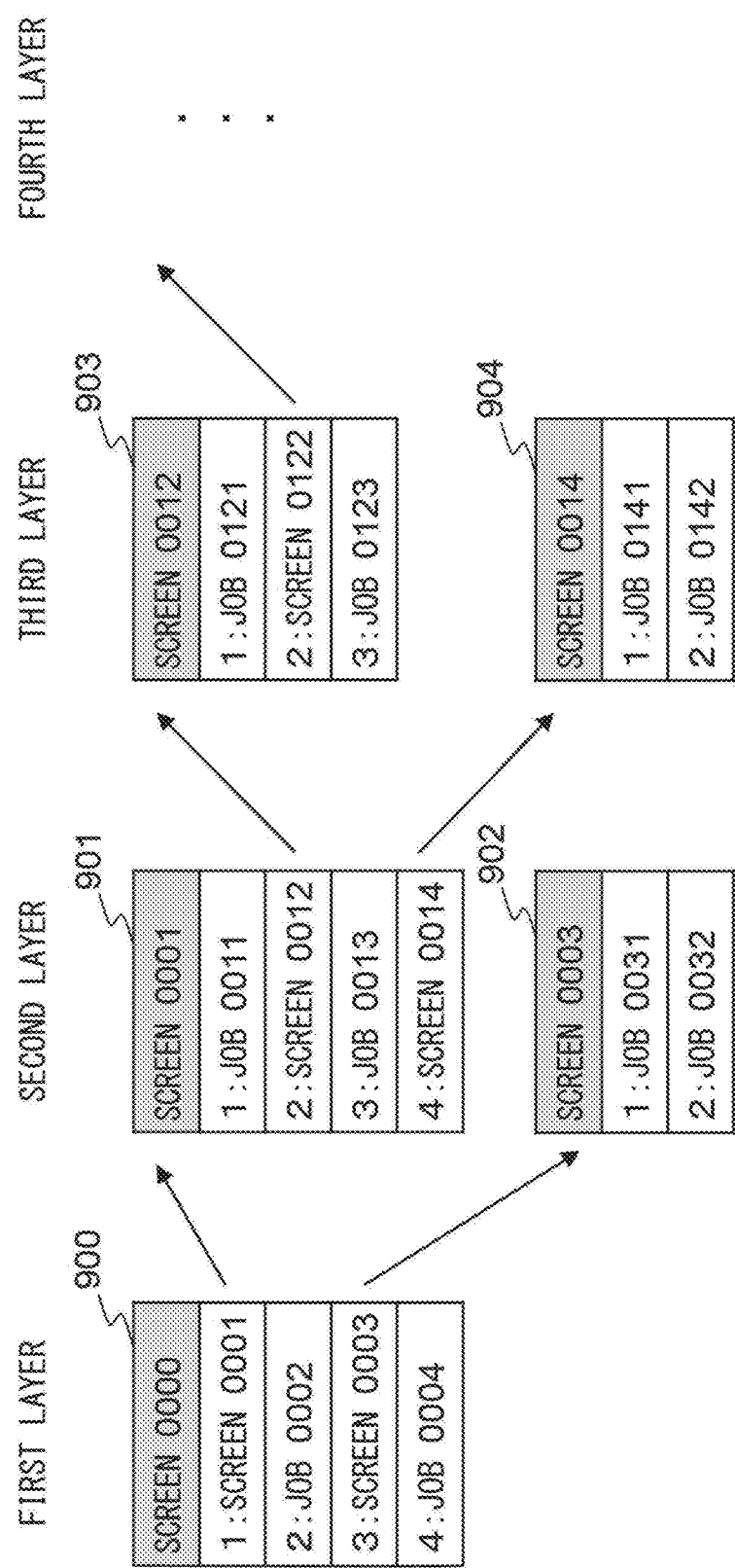
FIG. 9 is a schematic diagram for illustrating a screen displayed on a display device 106.

FIG. 9 is a schematic diagram for illustrating the screen displayed on the display device 106.

As illustrated in FIG. 9, the character information included in each item information included in the screen data of the first layer are arranged selectably by the user in the initial screen 900 initially displayed on the display device 106. In the initial screen 900 shown in FIG. 9, the jobs are selectably arranged in the second item and the fourth item, and the screen transitions for transitioning to the second layer are selectably arranged in the first item and the third item. When the job arranged in the second item or the fourth item is selected, the image reading processing is performed according to the selected job. On the other hand, when the screen transition arranged in the first item or the third item is selected, a screen 901 or 902 based on the screen data of the second layer indicated in the transition destination information corresponding to the selected item is displayed.

Similarly, in the screens 901 and 902, the character information included in each item information included in the corresponding screen data are arranged selectably by the user. When the job arranged in the screen 901 or 902 is selected, the image reading processing is executed according to the selected job. On the other hand, when the screen transition arranged on the screen 901 is selected, a screen 903 or 904 based on the screen data of the third layer indicated by the transition destination information corresponding to the selected item is displayed.

The user can easily select a desired job by transitioning the screen displayed on the display device 106 to a screen in which the desired job is selectably arranged to select the desired job. Therefore, the image reading apparatus 100 can improve the convenience of the user.

Figure 10:
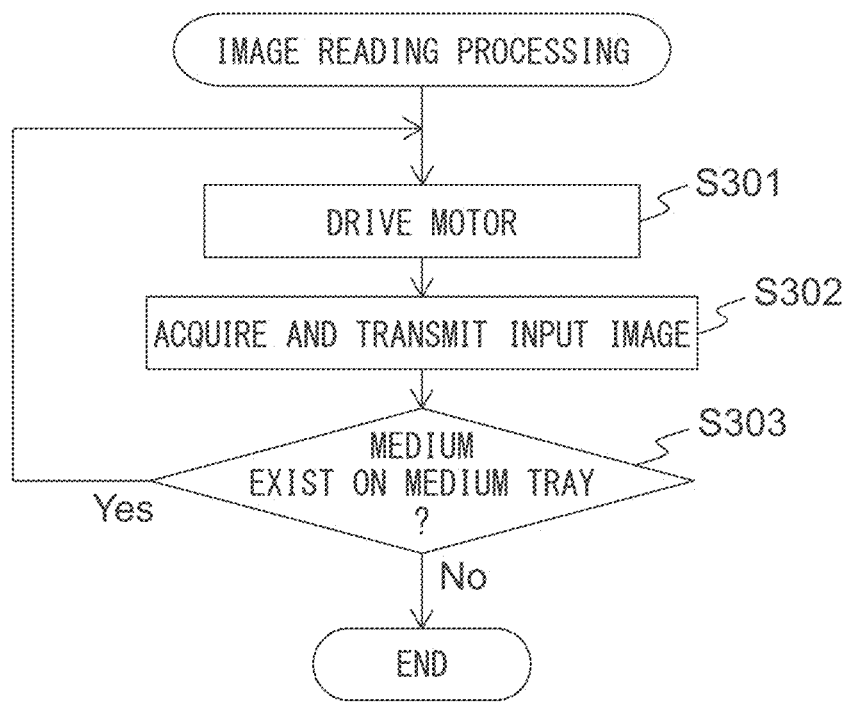
FIG. 10 is a flowchart illustrating an operation example of an image reading processing.

FIG. 10 is a flowchart illustrating an operation example of the image reading processing of the image reading apparatus 100.

Hereinafter, an example of the operation of the image reading processing of the image reading apparatus 100 will be described with referring to the flowchart illustrated in FIG. 10. Note that a flow of the operation described below is performed in cooperation with each element of the image reading apparatus 100 mainly by the second processing circuit 160, based on the program being previously stored in the second storage device 140. The flow of the operation shown in FIG. 10 is performed when the image reading processing is started at step S205 of the flow chart shown in FIG. 8.

First, the read control module 162 drives the motor 121 to rotate the feed roller 112, the brake roller 113, and the first to fourth conveyance rollers 114, 115, 117, and 118 to convey the medium (step 301). The read control module 162 controls the motor 121 to rotate at a speed (a conveyance speed of the medium) corresponding to the setting information corresponding to the item specified in step S203 of FIG. 8.

Next, the read control module 162 controls the imaging device 116 to read an image from the medium, acquires the input image from the imaging device 116, and transmits the input image to the information processing apparatus 200 or other information processing apparatus via the communication device 122 (step S302). The read control module 162 controls the imaging device 116 to read an image from the medium according to settings (color setting, resolution, reading surface, and the like) corresponding to the setting information corresponding to the items specified in the step S203 of FIG. 8. The read control module 162 may transmit the input image to the first processing circuit 150 by the well-known inter-processor communication, and the first processing circuit 150 may transmit the input image to the information processing apparatus 200 or other information processing apparatus via the communication device 122.

Next, the read control module 162 acquires the medium signal from the sensor 111 and determines whether or not the medium is placed on die medium tray 103 based on die acquired medium signal (step S303) When the medium remains on the medium tray 103, the read control module 162 returns the process to step S301 and repeats die processes of steps S301 to S303. On the other hand, when no medium remains in the medium tray 103, the read control module 162 ends the series of steps.

As described in detail above, in the image reading apparatus 100, while the second processing circuit 160 for the read control performs display control of the screen data, the first processing circuit 150 for the communication control selects the screen data to the displayed from among the hierarchically structured screen data and transmits the screen data to the second processing circuit 160. Thus, the image reading apparatus 100 suitably shares the processing required by the first processing circuit 150 and the second processing circuit 160 and appropriately displays the screen requested by the user even during the image reading processing. Therefore, the image reading apparatus 100 can display the screen based on the requested screen data among the plurality of screen data more efficiently.

In an embedded device such as a scanner device, a processor having low processing performance may be used to reduce equipment cost Therefore, such an embedded dev ice cannot make enough time to execute the display control processing in a state in which the processing load of the processor is high, such as during the image reading processing. The image reading apparatus 100 suitably shares the processing required by the first processing circuit 150 and the second processing circuit 160, thereby enabling the display control processing to be executed satisfactorily even when using the processor having low processing performance.

Further, in the image reading apparatus 100, the first processing circuit 150, which is separate from the second processing circuit 160 for the read control, selects the necessary screen data from among the plurality of screen data received from the information processing apparatus 200. Therefore, even when the number of screen data received from the information processing apparatus 200 is large, the image reading apparatus 100 can take a sufficient time to select the necessary screen data, and suitably display the screen based on the requested screen data.

Further, while all the screen data is transmitted collectively from the information processing apparatus 200 to the first processing circuit 150, all the screen data is not transmitted collectively from the first processing circuit 150 to the second processing circuit 160, and only the screen data necessary for generating the screen is individually transmitted from the first processing circuit 150 to the second processing circuit 160. Therefore, in the image reading apparatus 100, a state in which other processing cannot be executed by the transmission and reception processing of the screen data does not continue for a long time, and the image reading apparatus 100 can suitably perform the image reading processing.

Figure 11:
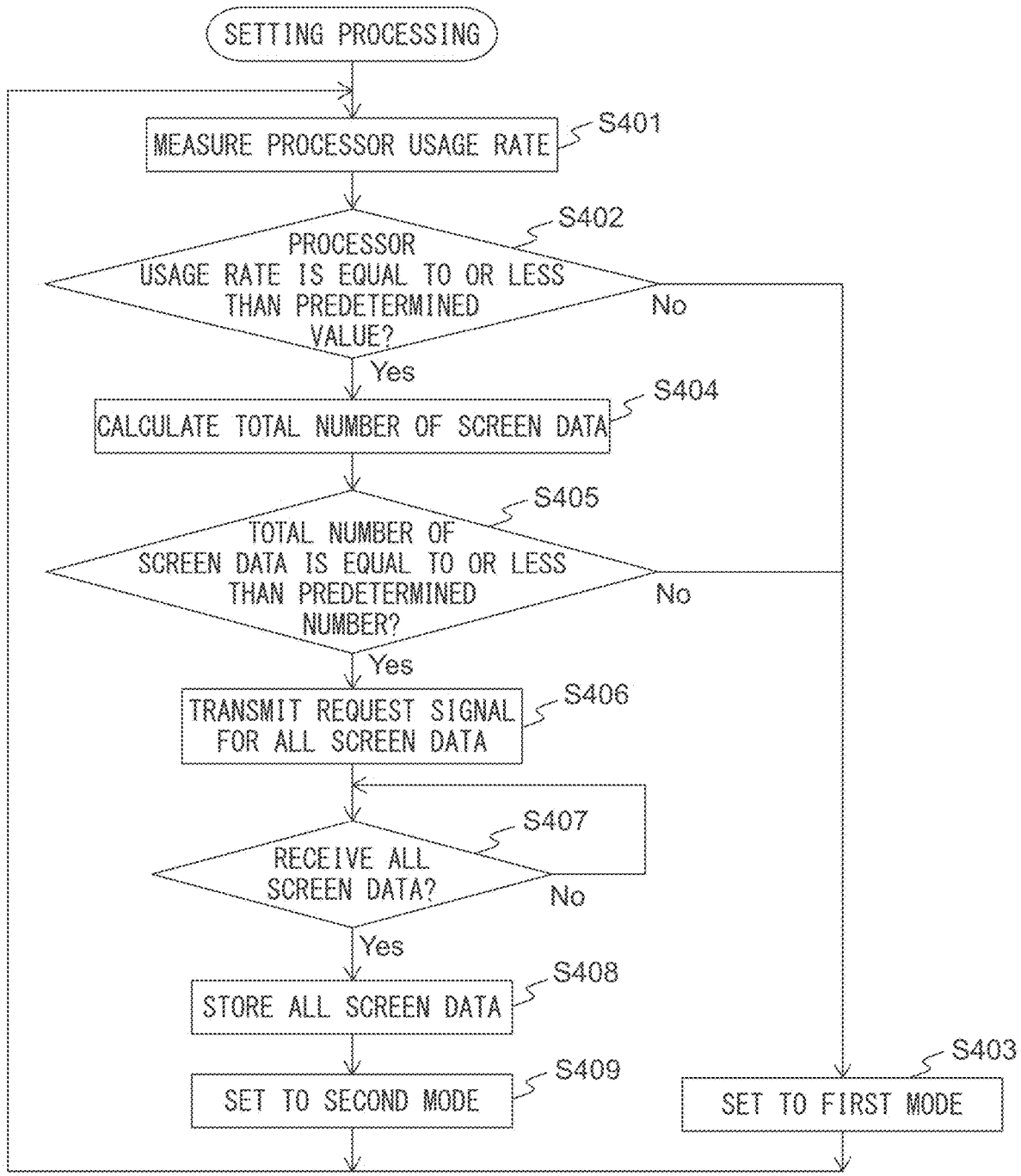
FIG. 11 is a flowchart illustrating an operation example of a setting processing.

FIG. 11 is a flowchart illustrating an operation example of the setting processing of the image reading apparatus 100 according to another embodiment.

Hereinafter, an example of the operation of the setting processing of the image reading apparatus 100 will be described with referring to a flowchart illustrated in FIG. 11. Note that a flow of the operation described below is performed in cooperation with each element of the image reading apparatus 100 mainly by the second processing circuit 160, based on the program being previously stored in the second storage device 140. The operation flow illustrated in FIG. 11 is periodically executed. In the present embodiment, the second processing circuit 160 is a processor such as a CPU or a DSP.

First, the monitoring module 163 measures the processor usage rate of the second processing circuit 160 (step S401). The monitoring module 163 measures a ratio of the operation time of each module of the second processing circuit 160 within the measurement period of the processor usage rate with respect to the measurement period, as the processor usage rate. The second processing circuit 160 may have an idle thread which operates when each module of the second processing circuit 160 does not operate, and measure processor usage rate based on the operation rate of the idle thread. Thus, the monitoring module 163 periodically measures and monitors the processor usage rate of the second processing circuit 160.

Next, the monitoring module 163 determines whether or not the measured processor usage rate is equal to or less than a predetermined value (step S402) The predetermined value is, for example, preset to a value between a processor usage rate when the second processing circuit 160 is executing the image reading processing and a processor usage rate when the second processing circuit 160 is not executing the image reading processing.

When the processor usage rate is more than the predetermined value, the monitoring module 163 sets an operation mode to the first mode (step S403) and returns the process to step S401 In the first mode, the process of specifying and reading the requested screen data from among the plurality of screen data is executed by the first processing circuit 150.

On the other hand, when the processor usage rate is equal to or less than the predetermined value, the monitoring module 163 calculates a total number of the plurality of screen data received from the information processing apparatus 200 (step S404).

Next, the monitoring module 163 determines whether or not the total number of the calculated plurality of screen data is equal to or less than a predetermined number (step S405). The predetermined number is, for example, preset to a number wherein a specific screen data can be extracted from the predetermined number of screen data in a sufficiently short time.

When the total number of the plurality of screen data is more than the predetermined number, the monitoring module 163 sets the operation mode to the first mode (step S403) and returns the process to step S401.

On the other hand, when the total number of the plurality of screen data is equal to or less than the predetermined number, the display control module 161 transmits the request signal for requesting acquisition of all the screen data received from the information processing apparatus 200 to the data management module 152 (step S406). That is, the request signal includes the index information of all the screen data stored in the screen data table.

Next, the display control module 161 determines whether or not it has received the screen data requested by the request signal, i.e., all the screen data received from the information processing apparatus 200 from the data management module 152 (step S407). The display control module 161 waits until it receives all the screen data from the data management module 152.

On the other hand, the display control module 161 stores all the received screen data in the second storage device 140 when it has received all the screen data from the data management module 152 (step S408). The display control module 161 provides the screen data table in the second storage device 140 and stores all the screen data in the screen data table Thus, the display control module 161 acquires all of the plurality of screen data received from the information processing apparatus 200 from the first processing circuit 150 to store all of the plurality of screen data in the second storage device 140.

Next, the monitoring module 163 sets the operation mode to a second mode (step S409), and returns the process to step S401. In the second mode, the process of specifying and reading the requested screen data from among the plurality of screen data is executed by the second processing circuit 160.

In steps S401 to S404: when the processor usage rate is equal to or less than the predetermined value and the total number of the screen data is more than the predetermined number, the monitoring module 163 may execute the processes of steps S406 to S409 and set the operation mode to the second mode. Further, when the processor usage rate is more than the predetermined value and the total number of the screen data is equal to or less than the predetermined number, the monitoring module 163 may execute the processes of steps S406 to S409 and set the operation mode to the second mode. Further, the processes of steps S401 to S402 may be omitted, the monitoring module 163 may set the operation mode based only on whether or not the total number of the screen data is equal to or less than the predetermined number. Further, the processes of steps S404 to S405 may be omitted, the monitoring module 163 may set the operation mode based only on whether or not the processor usage rate is equal to or less than the predetermined value.

Further, the data management module 152 may erase each screen data stored in the first storage device 130 when it transmits all the screen data to the display control module 161 in accordance with the request signal transmitted in step S406. In this case, in step S403, when the monitoring module 163 sets the operation inode to the first mode, the display control module 161 transmits all the screen data to the data management module 152, and the data management module 152 restores all the received screen data in the first storage device 130. Thus, during operation in the second mode, the data management module 152 can increase the tree capacity of the first storage device 130, thereby can temporarily store the new information in the first storage device 130 when receiving the new information from the information processing apparatus 200.

Figure 12:
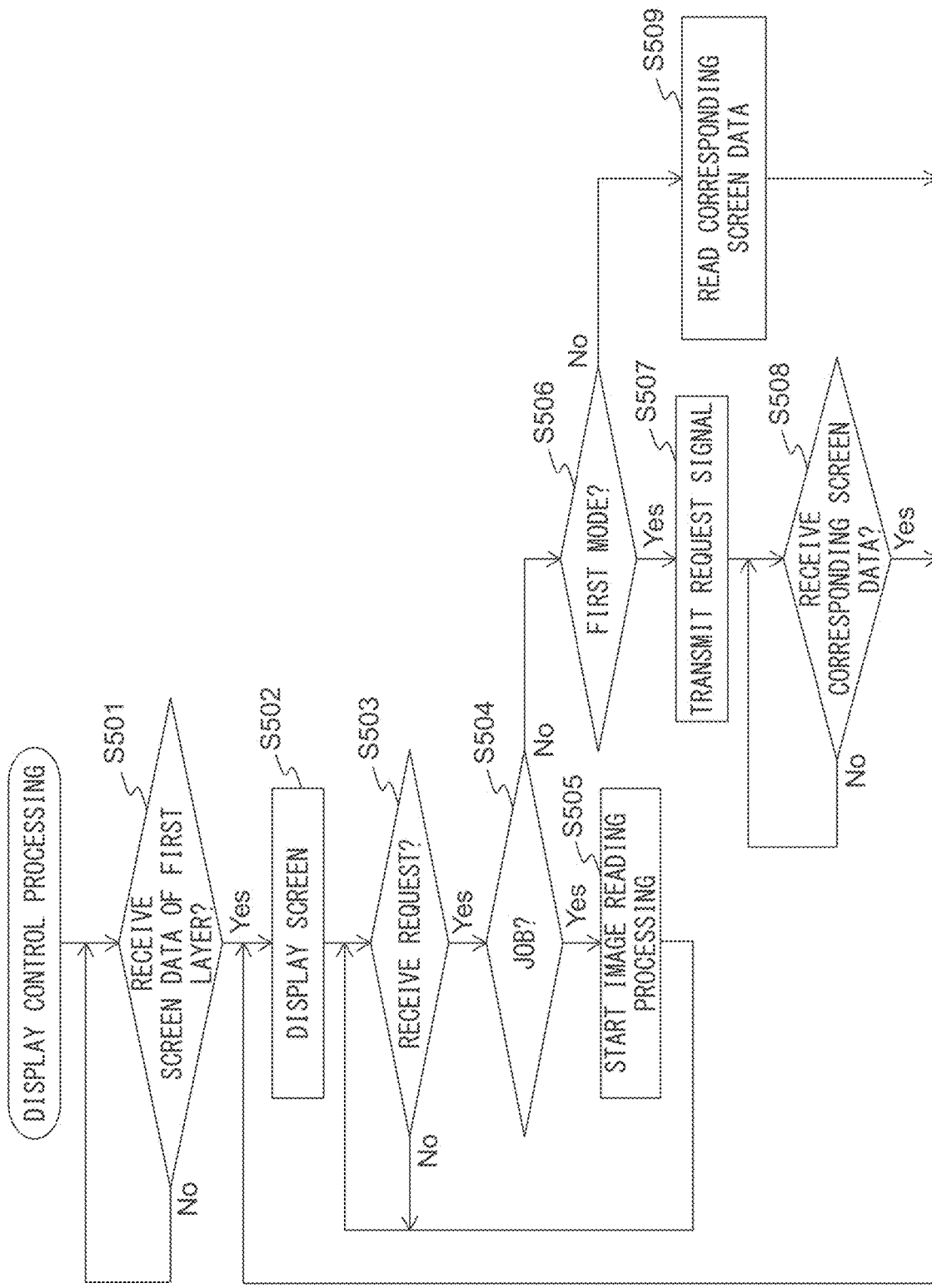
FIG. 12 is a flowchart illustrating an operation example of another display control processing.

FIG. 12 is a flowchart illustrating an operation example of the display control processing of the image reading apparatus 100 according to another embodiment.

The display control process shown in FIG. 12 is executed instead of the display control processing shown in FIG. 8 when the setting processing shown in FIG. 11 is executed Since the processes of steps S501 to S505 of the flowchart shown in FIG. 12 is similar to the processes of steps S20 to S205 of the flowchart shown in FIG. 8, a detailed description thereof will be omitted, and hereinafter, the processes of steps S506 to S509 will be described.

In step S504, when the specified item is the screen transition, the display control module 161 determines whether the currently set operation mode is the first mode or the second mode (step S506).

When the currently set operation mode is the first mode, the display control module 161, similarly to the process of step S206 of FIG. 8, transmits the request signal including the transition destination information corresponding to the specified item to the data management module 152 (step S507).

Next, the display control module 161, similarly to the process of step S207 of FIG. 8, determines whether or not it has received the screen data requested by the request signal front the data management module 152 (step S508). The display control module 161 waits until it receives the screen data from the data management module 152. On the other hand, the display control module 161 proceeds the process to step S502, generates the screen based on the received screen data, and displays it on the display device 106 when it has received the screen data from the data management module 152. Thereafter, the display control module 161 repeats the processes of steps S503 to S509.

On the other hand, when the currently set operation mode is the second mode, the display control module 161 reads the screen data corresponding to the transition destination information (index information) corresponding to the specified item from the screen data table stored in the second storage device 140 (step S509) The display control module 161 refers to the screen data table stored in the second storage device 140, specifies the screen data corresponding to the transition destination information (index information) corresponding to the specified item, and reads the screen data from the screen data table. Then, the display control module 161 proceeds the process to step S502, generates the screen based on the read screen data, and displays it on the display device 106. Thereafter, the display control module 161 repeats the processes of steps S503 to S509.

As described above, when the processor usage rate is equal to or less than the predetermined value, the display control module 161 determines whether or not displaying the screen based on the screen data of the second predetermined layer is requested while the screen based on screen data of the first predetermined layer among the plurality of screen data is displayed on the display device 106. When displaying the screen based on the screen data of the second predetermined layer is requested, the display control module 161 reads the screen data of the second predetermined layer from the second storage device 140 to display the screen based on the screen data on the display device 106. In other words, when the processing load of the second processing circuit 160 is low, as when the image reading processing is not executed, the display control module 161 selects the screen data to be displayed from the hierarchically structured screen data by itself. Therefore, even when the processing load of the first processing circuit 150 is high as during the communication processing with the information processing apparatus 200, the image reading apparatus 100 can display the screen based on the requested screen data among the plurality of screen data more efficiently.

Similarly, when the total number of the plurality of screen data is equal to or less than the predetermined number, the display control module 161 determines whether or not displaying the screen based on the screen data of the second predetermined layer is requested while the screen based on die screen data of the first predetermined layer among the plurality of screen data is displayed on the display device 106. When displaying the screen based on the screen data of the second predetermined layer is requested the display control module 161 reads the screen data of the second predetermined layer from the second storage device 140 and displays the screen based on the screen data on the display device 106. In other words, when the total number of the plurality of screen data received from the information processing apparatus 200 is sufficiently small, the display control module 161 selects the screen data to be displayed from the hierarchically structured screen data by itself. Therefore, even when the processing load of the first processing circuit 150 is high as during the communication processing with the information processing apparatus 200, the image reading apparatus 100 can display the screen based on the requested screen data among the plurality of screen data more efficiently.

As described in detail above, the image reading apparatus 100 can display the screen based on the requested screen data among the plurality of screen data more efficiently even when the operation mode is set based on the processor usage rate of the second processing circuit 160. Further, the image reading apparatus 100 can display the screen based on the requested screen data among the plurality of screen data more efficiently, even when the operation mode is set based on the total number of the plurality of screen data received from the information processing apparatus 200.

Figure 13:
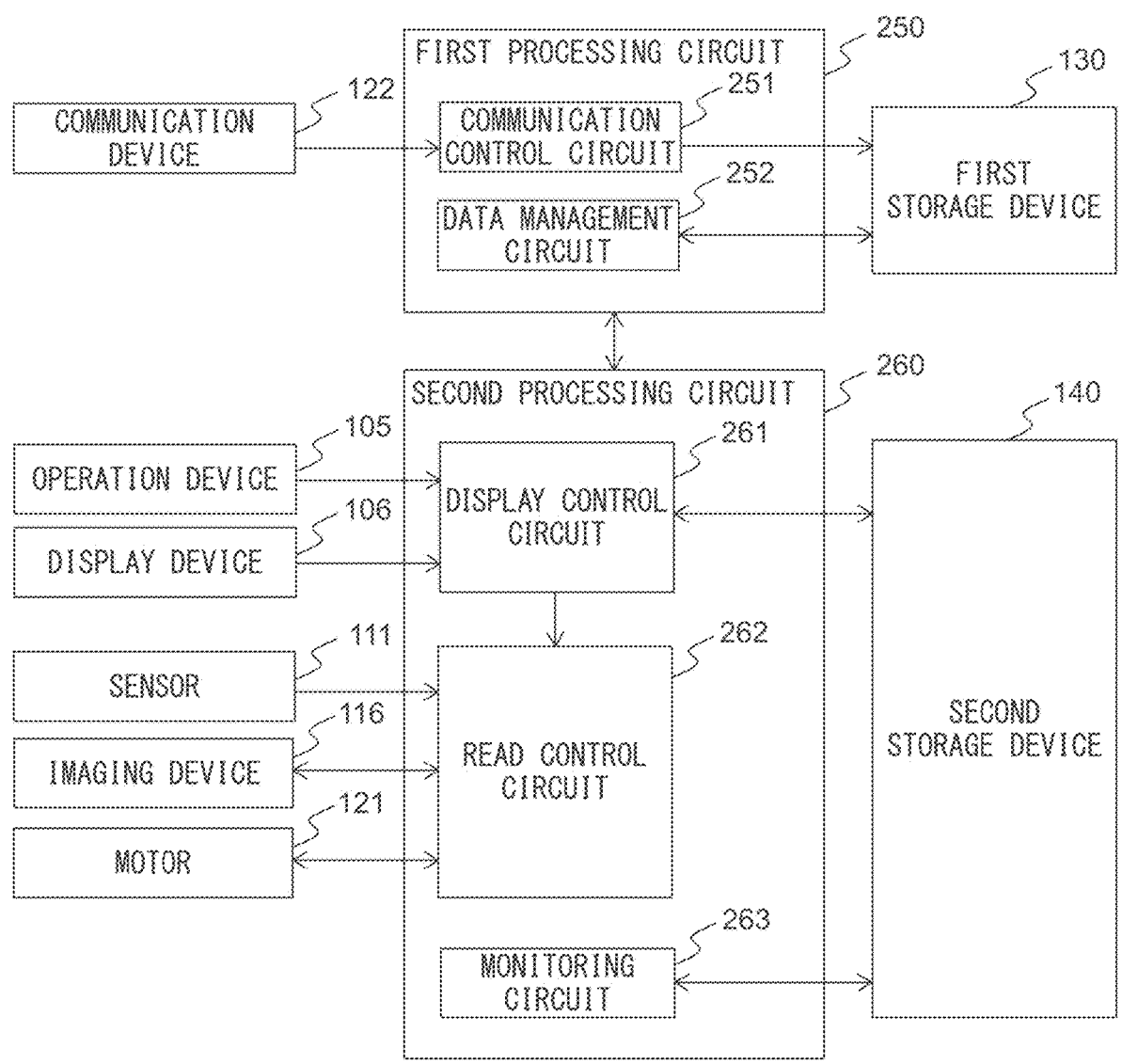
FIG. 13 is a diagram illustrating a schematic configuration of another first processing circuit 250, etc.

FIG. 13 is a diagram illustrating a schematic configuration of a first processing circuit 250 and a second processing circuit 200 in the image reading apparatus according to another embodiment. The first processing circuit 250 is used in place of the first processing circuit 150 of the image reading apparatus 100 and executes the data management processing instead of the first processing circuit 150. The second processing circuit 260 is used in place of the second processing circuit 160 of the image reading apparatus 100, and executes the display control processing, the image reading processing, or the setting processing instead of the second processing circuit 160. The first processing circuit 250 includes a communication control circuit 251 and a data management circuit 252, etc. The second processing circuit 260 includes a display control circuit 261, a read control circuit 262, a monitoring circuit 263, etc. Note that each unit may be configured by an independent integrated circuit, a microprocessor, firmware, etc.

The communication control circuit 251 is an example of a communication control module, and has a function similar to the communication control module 151. The communication control circuit 251 receives the plurality of screen data from the information processing apparatus 200 via the communication device 122 and stores it in the first storage device 130.

The data management circuit 252 is an example of a data management module, and has a function similar to the data management module 152. The data management circuit 252 receives the request signal from die second processing circuit 260, reads the screen data specified by the received request signal from the first storage device 130, and transmits the screen data to the second processing circuit 260.

The display control circuit 261 is an example of a display control module, and has a function similar to the display control module 161. The display control circuit 261 generates the screen based on the screen data received from the first processing circuit 250 and displays it on the display device 106, and receives the request from the user using the operation device 105. When displaying the other screen is requested, the display control circuit 261 transmits the request signal to the first processing circuit 250, and generates the screen based on the screen data received from the first processing circuit 250 to display on the display device 106. When executing the image reading processing is requested, the display control circuit 261 transmits the signal for instructing executing the image reading processing to the read control circuit 262. The display control circuit 261 reads the operation mode of the image reading apparatus 100 from the second storage device 140. When the operation mode is the second mode, the display control circuit 261 transmits the request signal for requesting acquiring all the screen data to the first processing circuit 250, stores the received screen data in the second storage device 140, and thereafter generates the screen from the screen data stored in the second storage device 140.

The read control circuit 262 is an example of a read control module and has a function similar to the read control module 162. The read control circuit 262 controls the motor 121 and the imaging device 116 according to the medium signal from the sensor 111 to acquire the input image when it receives the signal for instructing executing the image read processing from the display control circuit 261. The read control circuit 262 transmits the acquired input image to the information processing apparatus through the first processing circuit 250 and the communication device 122.

The monitoring circuit 263 is an example of a monitoring module, and has a function similar to the monitoring module 163. The monitoring circuit 263 calculates the processor usage rate of the second processing circuit 260 and/or the total number of screen data received from the information processing apparatus 200, determines the operation mode according to the calculated result, and stores it in the second storage device 140.

As described in detail above, the image reading apparatus can display the screen based on the requested screen data among the plurality of screen data more efficiently, even when using the first processing circuit 250 and the second processing circuit 260.

According to the embodiment, the image leading apparatus, the method, and the program can display a screen based on a requested screen data among a plurality of screen data more efficiently.

All examples and conditional language recited herein are intended for pedagogical purposes to aid the reader in understanding die invention and the concepts contributed by the inventor to furthering the art, and are to be construed as being without, limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. An image reading apparatus comprising:
a communication device capable of communicating with an information processing apparatus;
a storage device;
a display device;
a reading device to read an image from a medium;
a first processor to control the communication device to receive a plurality of screen data divided into a plurality of layers from the information processing apparatus, and store the received plurality of screen data in the storage device; and
a second processor to control the reading device to read an image from the medium and display a screen based on the plurality of screen data on the display device, wherein
the second processor transmits a request signal to the first processor when, while a screen based on screen data of a first predetermined layer among the plurality of screen data is displayed on the display device, displaying a screen based on screen data of a second predetermined layer is requested, and wherein
the first processor reads the screen data of the second predetermined layer from the storage device to transmit the read screen data to the second processor based on the request signal.

2. The image reading apparatus according to claim 1, further comprising a second storage device, wherein
the second processor
monitors a processor usage rate of the second processor,
acquires the plurality of screen data from the first processor to store the plurality of screen data in the second storage device when the processor usage rate is equal to or less than a predetermined value, and
reads the screen data of the second predetermined layer from the second storage device to display the screen based on the screen data read from the second storage device on the display device when displaying the screen data of the second predetermined layer is requested while the screen based on the screen data of the first predetermined layer among the plurality of screen data is displayed on the display device.

3. The image reading apparatus according to claim 1, further comprising a second storage device, wherein
the second processor
acquires the plurality of screen data from the first processor to store the plurality of screen data in the second storage device when a total number of the plurality of screen data is equal to or less than a predetermined number, and
reads the screen data of the second predetermined layer from the second storage device to display the screen based on the screen data read from the second storage device on the display device when displaying the screen data of the second predetermined layer is requested while the screen based on the screen data of the first predetermined layer among the plurality of screen data is displayed on the display device.

4. A method for controlling an image reading apparatus, comprising:
controlling a communication device capable of communicating with an information processing apparatus to receive a plurality of screen data divided into a plurality of layers from the information processing apparatus, and storing the received plurality of screen data in a storage device, by a first processor,
controlling a reading device to read an image from a medium and displaying a screen based on the plurality of screen data on a display device, by a second processor;
transmitting a request signal to the first processor, by the second processor, when, while a screen based on screen data of a first predetermined layer among the plurality of screen data is displayed on the display device, displaying a screen based on screen data of a second predetermined layer is requested; and reading the screen data of the second predetermined layer from the storage device to transmit the read screen data to the second processor based on the request signal, by the first processor.

5. The method according to claim 4, further comprising:
monitoring a processor usage rate of the second processor, by the second processor;
acquiring the plurality of screen data from the first processor to store the plurality of screen data in a second storage device, by the second processor, when the processor usage rate is equal to or less than a predetermined value; and
reading the screen data of the second predetermined layer from the second storage device to display the screen based on the screen data read front the second storage device on the display device, by the second processor, when displaying the screen data of the second predetermined layer is requested while the screen based on the screen data of the first predetermined layer among the plurality of screen data is displayed on the display device.

6. The method according to claim 4, further comprising:
acquiring the plurality of screen data from the first processor to store the plurality of screen data in a second storage device, by the second processor, when a total number of the plurality of screen data is equal to or less than a predetermined number; and
reading the screen data of the second predetermined layer from the second storage device to display the screen based on the screen data read from the second storage device on the display device, by die second processor, when displaying the screen data of the second predetermined layer is requested while the screen based on the screen data of the first predetermined layer among the plurality of screen data is displayed on the display device.

7. A computer-readable, non-transitory medium storing a computer program, wherein the computer program causes a second processor of an image reading apparatus including a communication device capable of communicating with an information processing apparatus, a storage device, a display device, a reading device to read an image from a medium, and a first processor to control the communication device to receive a plurality of screen data divided into a plurality of layers from the information processing apparatus, and store the received plurality of screen data in the storage device, to execute a process, the process comprising:
controlling the reading device to read an image from a medium and displaying a screen based on the plurality of screen data on the display device, and
when, while a screen based on screen data of a first predetermined layer among the plurality of screen data is displayed on the display device, displaying a screen based cm screen data of a second predetermined layer is requested, transmitting a request signal to the first processor to cause the first processor to read the screen data of the second predetermined layer from the storage device to transmit the read screen data to the second processor.

8. The computer-readable, non-transitory medium according to claim 7, the process further comprising:
monitoring a processor usage rate of the second processor;
acquiring the plurality of screen data from the first processor to store the plurality of screen data in a second storage device when the processor usage rate is equal to or less than a predetermined value; and
reading the screen data of the second predetermined layer from the second storage device to display the screen based on the screen data read from the second storage device on the display device when displaying the screen data of the second predetermined layer is requested while the screen based on the screen data of the first predetermined layer among the plurality of screen data is displayed on the display device.

9. The computer-readable, non-transitory medium according to claim 7, the process further comprising:
acquiring the plurality of screen data from the first processor to store the plurality of screen data in a second storage device when a total number of the plurality of screen data is equal to or less than a predetermined number; and
reading the screen data of the second predetermined layer front the second storage device to display the screen based on the screen data read from tire second storage device on the display device when displaying the screen data of the second predetermined layer is requested while the screen based on the screen data of the first predetermined layer among the plurality of screen data is displayed on the display device.

\* \* \* \* \*